US008837536B2

(12) United States Patent
O'Brien et al.

(10) Patent No.: US 8,837,536 B2
(45) Date of Patent: Sep. 16, 2014

(54) METHOD AND APPARATUS FOR CONTROLLING LIGHT BANDWIDTH

(75) Inventors: Kevin M. O'Brien, San Diego, CA (US); Fedor B. Trintchouk, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 1012 days.

(21) Appl. No.: 12/755,772

(22) Filed: Apr. 7, 2010

(65) Prior Publication Data

US 2011/0249691 A1    Oct. 13, 2011

(51) Int. Cl.
*H01S 3/10* (2006.01)

(52) U.S. Cl.
USPC .......................................................... 372/25

(58) Field of Classification Search
USPC ...................... 372/29.01, 107, 14, 15, 16, 20
See application file for complete search history.

(56) References Cited

U.S. PATENT DOCUMENTS

| | | | |
|---|---|---|---|
| 5,194,893 A | 3/1993 | Nishi | |
| 6,393,037 B1 | 5/2002 | Basting et al. | |
| 6,671,294 B2 | 12/2003 | Kroyan et al. | |
| 6,853,653 B2 | 2/2005 | Spangler et al. | |
| 6,952,267 B2 | 10/2005 | Rafac | |
| 7,085,302 B2 | 8/2006 | Nagai | |
| 7,088,758 B2 | 8/2006 | Sandstrom et al. | |
| 7,139,301 B2 | 11/2006 | Kroyan et al. | |
| 7,154,928 B2 | 12/2006 | Sandstrom et al. | |
| 7,298,770 B2 | 11/2007 | Spangler et al. | |
| 7,317,536 B2 | 1/2008 | Rafac | |
| 7,366,219 B2 | 4/2008 | Algots et al. | |
| 7,382,815 B2 | 6/2008 | Spangler et al. | |
| 7,653,095 B2 | 1/2010 | Reiley et al. | |
| 7,653,112 B2 | 1/2010 | Gillespie et al. | |
| 2004/0056010 A1* | 3/2004 | Ho et al. ................... 219/121.78 |
| 2006/0114956 A1* | 6/2006 | Sandstrom et al. ............. 372/55 |
| 2007/0268568 A1* | 11/2007 | Higashi et al. ................ 359/333 |
| 2007/0297467 A1 | 12/2007 | Fomenkov et al. | |
| 2008/0232408 A1* | 9/2008 | O'Brien et al. ................. 372/19 |
| 2008/0253408 A1* | 10/2008 | Ishihara .......................... 372/20 |
| 2008/0253413 A1 | 10/2008 | Partlo | |

OTHER PUBLICATIONS

International Search Report in counterpart application, PCT/US11/31116, issued by Lee W. Young on Jun. 13, 2011 of the U.S. International Searching Authority, 2 pages.

Written Opinion in counterpart application, PCT/US11/31116, issued by Lee W. Young on Jun. 13, 2011 of the U.S. International Searching Authority, 5 pages.

(Continued)

*Primary Examiner* — Tuan Nguyen

(74) *Attorney, Agent, or Firm* — DiBerardino McGovern IP Group LLC

(57) ABSTRACT

An apparatus includes a light source that produces a light beam, a bandwidth measurement system, a plurality of bandwidth actuation systems, and a control system. Each bandwidth actuation system includes one or more bandwidth actuators and each bandwidth actuation system is connected to an optical feature that is optically coupled to the produced light beam and operable to modify the connected optical feature to select a bandwidth within a bandwidth range of the produced light beam. The control system is connected to the bandwidth measurement system and to the plurality of bandwidth actuation systems. The control system is configured to switch between activating and operating a first bandwidth actuation system and activating and operating a second bandwidth actuation system independently and separately of activating and operating the first bandwidth actuation system based on a provided bandwidth measurement and a selected target bandwidth.

24 Claims, 8 Drawing Sheets

(56) References Cited

OTHER PUBLICATIONS

"Laser Bandwidth and Other Sources of Focus Blur in Lithography," T. Brunner et al., Optical Microlithography XVIII, Proc. of SPIE, ed. Donis G. Flagello, vol. 6154, Oct. 1, 2006.
"Active Spectral Control of DUV light sources for OPE minimization," Wayne J. Dunstan et al., Optical Microlithography XIX, Feb. 21-24, 2006, San Jose, CA, vol. 6154(3).
"Active spectral-control techniques for improving OPC," Robert Jacques et al., Dec. 2006, http://www.solid-state.com/display_article/279735/5/none/none/Feat/Active-spectral-control-techniques-for-improving-OPC, 4 pages.
U.S. Appl. No. 61/236,848, "Active Spectral Control of Laser Light Source," Nakgeuon Seong et al., filed Aug. 25, 2009.
U.S. Appl. No. 12/605,306, "System Method and Apparatus for Selecting and Controlling Light Source Bandwidth," Efrain Figueroa et al., filed Oct. 23, 2009.

* cited by examiner

METHOD AND APPARATUS FOR CONTROLLING LIGHT BANDWIDTH

TECHNICAL FIELD

The disclosed subject matter relates to a method for controlling laser light bandwidth.

BACKGROUND

An accurate knowledge of a bandwidth of an optical source such as a laser is important in many scientific and industrial applications, such as, for example, for critical dimension control in deep ultraviolet (DUV) semiconductor photolithography in which a substrate or wafer is irradiated by a light beam produced by the optical source while the substrate or wafer is moved axially along an optical axis of the light beam.

The bandwidth of laser light is the width of the intensity spectrum of the laser light output from the laser, and this width can be given in terms of wavelength or frequency of the laser light. Any suitable metric or mathematical construction related to the details of the optical source spectrum can be used to estimate the bandwidth of the laser light. For example, the full width of the spectrum at a fraction (X) of the maximum peak intensity (referred to as FWXM) can be used to estimate the laser light bandwidth. As another example, a width of the spectrum that contains a fraction (Y) of the integrated spectral intensity (referred to as EY) can be used to estimate the laser light bandwidth.

SUMMARY

In one general aspect, a method includes producing a light beam; enabling control of a bandwidth of the produced light beam within a first range of bandwidths including enabling the activation and control of a first bandwidth actuation system connected to a first optical feature optically coupled to the produced light beam; and enabling control of a bandwidth of the produced light beam within a second range of bandwidths including enabling the activation and control of a second bandwidth actuation system connected to a second optical feature optically coupled to the produced light beam. The second range of bandwidths is distinct from the first range of bandwidths.

Implementations can include one or more of the following features. For example, the method can also include receiving a request to change a bandwidth of the produced light beam from the first range of bandwidths to the second range of bandwidths. The method can include switching between bandwidth control within the first range and bandwidth control within the second range in response to a command to switch.

The method can include switching between bandwidth control within the first range to bandwidth control within the second range. The switching includes selecting second target bandwidth information; setting the first bandwidth actuation system to a first fixed state; switching a bandwidth measurement system from a first configuration to a second configuration; receiving measured bandwidth information from the bandwidth measurement system while operating in the second configuration; determining whether the measured bandwidth information matches the second target bandwidth information; and activating the second bandwidth actuation system to cause the second optical feature to modify the bandwidth of the produced light beam until it is determined that the measured bandwidth information matches the second target bandwidth information. The method can include storing information about the state of one or more components of the first bandwidth actuation system before setting the first bandwidth actuation system to the first fixed state.

The first fixed state can be the state of the first bandwidth actuation system at the moment the request to change the bandwidth of the produced light beam from the first bandwidth range to the second bandwidth range is received. The first fixed state can be determined from a function of the state of the first bandwidth actuation system at the moment that a request is received to change the bandwidth of the produced light beam from the first bandwidth range to the second bandwidth range.

The method can include controlling the second bandwidth actuation system to reduce an absolute error between the measured bandwidth information and the second target bandwidth information until a request is received to change the bandwidth of the produced light beam from the second bandwidth range to the first bandwidth range.

The method can include controlling the second bandwidth actuation system in a reset mode after switching the bandwidth measurement system from the first configuration to the second configuration.

The method can include switching between bandwidth control within the second range to bandwidth control within the first range upon receipt of the request to change bandwidth of the produced light beam from the second bandwidth range to the first bandwidth range. The switching includes selecting first target bandwidth information; setting the second bandwidth actuation system to a second fixed state; switching the bandwidth measurement system from the second configuration to the first configuration; receiving measured bandwidth information from the bandwidth measurement system while operating in the first configuration; determining whether the measured bandwidth information matches the first target bandwidth information; and activating the first bandwidth actuation system to cause the first optical feature to modify the bandwidth of the produced light beam until it is determined that the measured bandwidth information matches the first target bandwidth information.

The second fixed state can be the state of the second bandwidth actuation system at the moment the request to change the bandwidth of the produced light beam from the second bandwidth range to the first bandwidth range is received. The second fixed state can be a pre-determined state that is determined during calibration.

The method can also include controlling the first bandwidth actuation system to reduce the absolute error between the measured bandwidth information and the first target bandwidth information until a request is received to change the bandwidth of the produced light beam from the first bandwidth range to the second bandwidth range. The method can also include sending a signal to the first bandwidth actuation system to return to the state that was stored prior to setting the first bandwidth actuation system to the first fixed state. The method can also include controlling the first bandwidth actuation system in a reset mode after switching the bandwidth measurement system from the second configuration to the first configuration.

The method can include switching between bandwidth control within the first range to bandwidth control within the second range. Switching between bandwidth control within the first range to bandwidth control within the second range can include switching a bandwidth measurement system from a first configuration to a second configuration.

Switching the bandwidth measurement system from the first configuration to the second configuration can include switching from a first set of calibration variables to a second set of calibration variables. The first set of calibration variables can be predetermined and configured to provide a metric that is tuned to estimate bandwidth over the first range of bandwidths; and the second set of calibration variables can be predetermined and configured to provide a metric that is tuned to estimate bandwidth over the second range of bandwidths.

The light beam can be produced by producing a laser beam.

In another general aspect, an apparatus includes a light source that produces a light beam; a bandwidth measurement system configured to receive a portion of light beam output from the light source and configured to measure a bandwidth of the light beam portion and to provide the bandwidth measurement; a plurality of bandwidth actuation systems, each bandwidth actuation system including one or more bandwidth actuators and each bandwidth actuation system being connected to an optical feature that is optically coupled to the produced light beam and operable to modify the connected optical feature to select a bandwidth within a bandwidth range of the produced light beam; and a control system connected to the bandwidth measurement system and to the plurality of bandwidth actuation systems. The control system is configured to switch between activating and operating a first bandwidth actuation system and activating and operating a second bandwidth actuation system independently and separately of activating and operating the first bandwidth actuation system based on a provided bandwidth measurement and a selected target bandwidth.

Implementations can include one or more of the following features. For example, the apparatus can also include a target bandwidth switch that is configured to be set at a target bandwidth that is within a target bandwidth range selected from a plurality of distinct target bandwidth ranges. The apparatus can include a lithography apparatus that receives the produced light beam.

The light source can include a laser source and the light beam can be a laser beam.

At least one of the optical features can include a dispersive element. At least one of the optical features can include a beam expander.

In another general aspect, a method of controlling a bandwidth of a pulsed laser beam includes producing the pulsed laser beam; receiving measured bandwidth information of the produced laser beam from a bandwidth measurement system; and based on the received measured bandwidth information, controlling a bandwidth of the produced laser beam to within a plurality of ranges of bandwidths including activating and controlling a plurality of bandwidth actuation systems each connected to an optical feature optically coupled to the produced laser beam. Each range of bandwidths in the plurality of ranges is distinct from each of the other ranges of bandwidths in the plurality of ranges.

Such a bandwidth control apparatus and method can be used to enable control of laser light bandwidth at a narrower bandwidth (for example, in a range below 0.5 picometers (pm)) and at a wider bandwidth (for example, in a range between 0.5 and 1.7 pm).

DRAWING DESCRIPTION

DESCRIPTION

Figure 1:
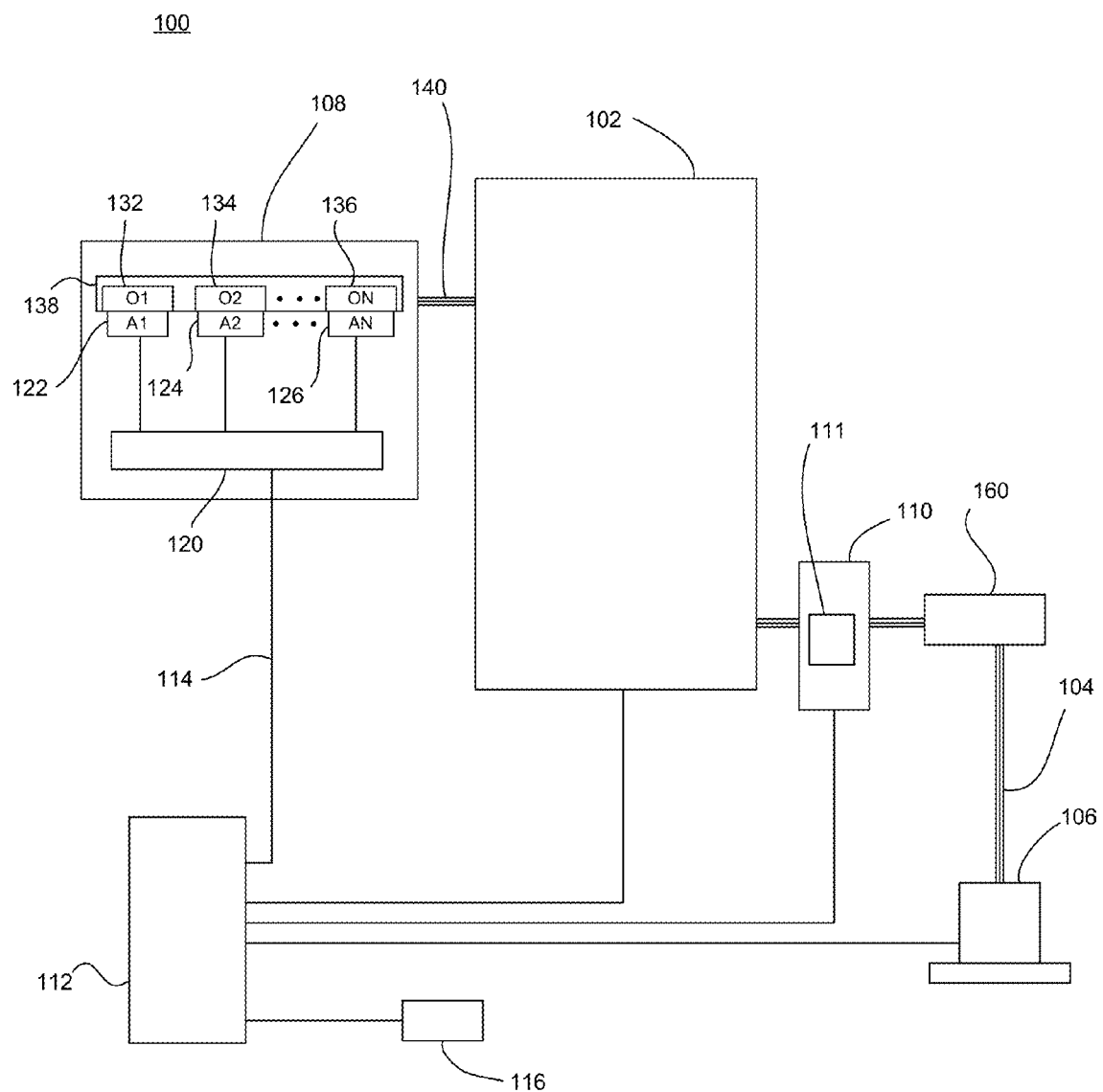
FIG. 1 is a block diagram of a light system providing input to an apparatus such as a lithography machine.

Referring to FIG. 1, a light system 100 includes a light source 102 that produces a light beam 104 that is delivered to an apparatus 106. The apparatus 106 can include a lithography machine that includes a scanner that requires several wavelengths centered on respective selected wavelengths and having respective bandwidths. To this end, the light system 100 also includes a bandwidth selection system (also referred to as a line narrowing module) 108 that receives a light beam 140 from the light source 102 and finely tunes the spectral output of the light source 102, a beam analysis module 110 that measures one or more properties (including bandwidth information) of the light beam 104 delivered to the apparatus 106, and a control system 112 connected to the line narrowing module 108, the light source 102, the beam analysis module 110, and the apparatus 106. Bandwidth information includes any information that can be used to determine bandwidth. Therefore, bandwidth information can be the actual bandwidth or it can be a measurement of another property from which the bandwidth can be calculated.

Among other purposes, as discussed below, the control system 112 provides operation and control of the light source 102 at a plurality of distinct bandwidth ranges and enables the light source 102 to automatically switch between the bandwidth ranges within a reasonable amount of time (for example, less than five seconds) without requiring manual intervention to perform switching. In some implementations, a bandwidth range is defined by an upper value of a bandwidth and a lower value of a bandwidth and all of the bandwidths between the upper value and the lower value. A bandwidth range could also or alternatively be defined by just an upper value or a lower value of a bandwidth and all of the bandwidths below (above) the upper (lower) value. A bandwidth range is distinct from another bandwidth range if the upper values of each range are unequal and/or if the lower values of each range are unequal. Bandwidth ranges can be distinct yet still overlap even though the upper and lower values are unequal. For example, a first bandwidth range can be all bandwidth values below 0.5 pm (an upper range) and a second bandwidth range can be values between 0.5 and 1.7 pm.

The control system 112 is able to effectuate the switching such that once the switching is complete, there is no discernable disturbance to normal operation of the light source 102.

The control system 112 is also configured to control certain other properties (for example, energy output, triggering times, timing, and dosage) of the light source 102. The control system 112 receives input from the beam analysis module 110, the apparatus 106, and components of the light source 102 to perform these operations. Additionally, the control system 112 can be connected to an output device 116 such as a monitor, light, or audio device to provide direct feedback to a user.

Figure 2:
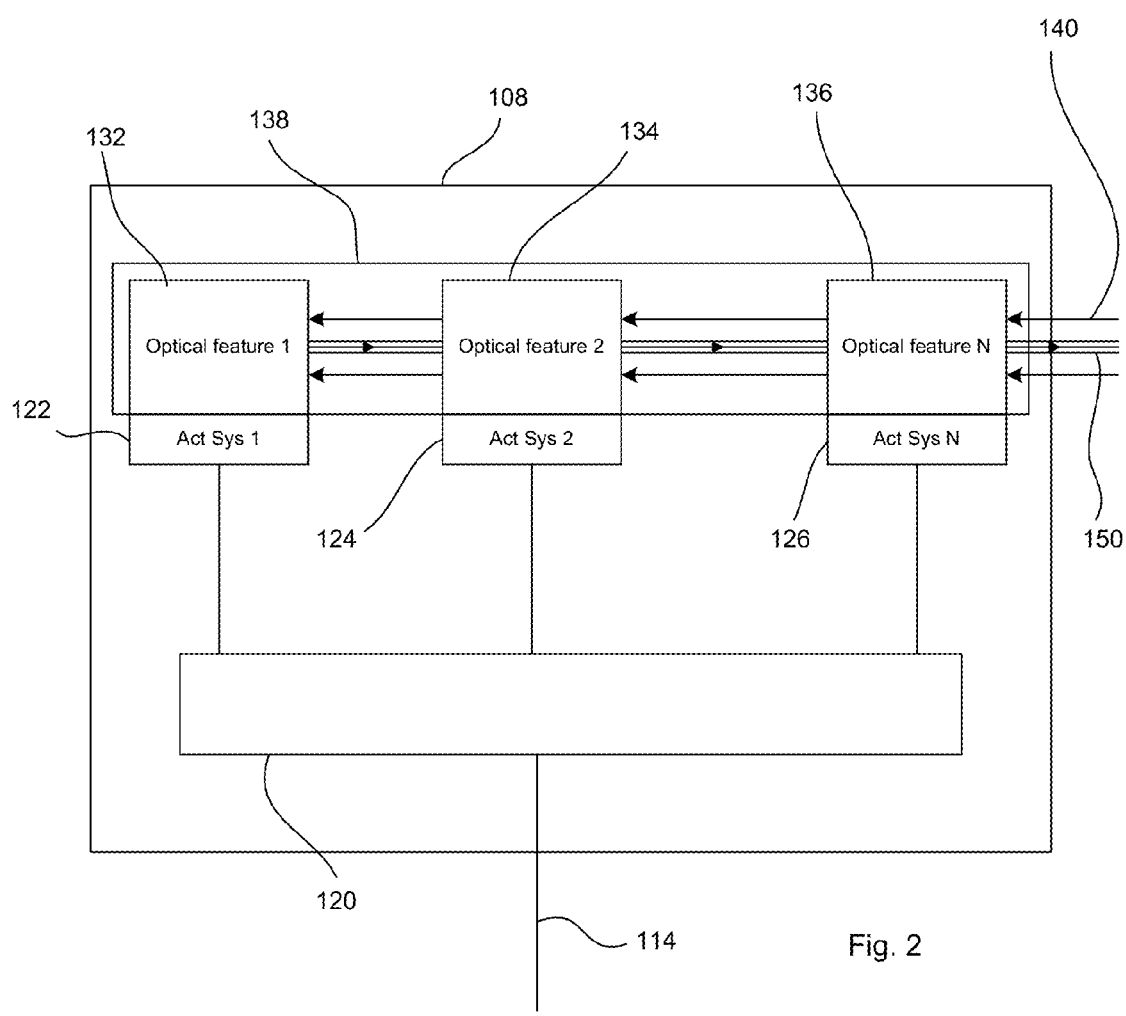
FIG. 2 is a block diagram of a bandwidth selection system of the light system of FIG. 1.

Referring also to FIG. 2, the line narrowing module 108 can include a bandwidth control module 120 that includes electronics in the form of any combination of firmware and software. The module 120 is connected to two or more bandwidth actuation systems 122, 124, 126. Each of the actuation systems 122, 124, 126 can include one or more actuators that are connected to respective optical features 132, 134, 136 of an optical system 138. The bandwidth control module 120 receives a signal 114 from the control system 112, the signal 114 including specific commands to operate or control one or more of the bandwidth actuation systems 122, 124, 126.

Each optical feature 132, 134, 136 is optically coupled to the light beam 140 produced by the light source 102. The optical system 138 that includes the optical features 132, 134, 136 can include dispersive optical elements such as reflective gratings and refractive optical elements such as rotatable prisms. An example of an optical system that includes optical features that are controlled by actuation systems can be found in U.S. application Ser. No. 12/605,306, entitled "System Method and Apparatus for Selecting and Controlling Light Source Bandwidth," and filed on Oct. 23, 2009 (the '306 application), which is incorporated herein by reference in its entirety. In the '306 application, an optical system is described that includes a beam expander (including one or more prisms) and a dispersive element such as a grating.

Each of the actuators of the actuation systems 122, 124, 126 is a mechanical device for moving or controlling the respective optical features 132, 134, 136 of the optical system 138. The actuators receive energy from the module 120, and convert that energy into some kind of motion imparted to the optical features 132, 134, 136 of the optical system 138. For example, in the '306 application, actuation systems are described such as force devices (to apply forces to regions of the grating) and rotation stages for rotating one or more of the prisms of the bean expander. The actuation systems 122, 124, 126 can include, for example, motors such as stepper motors, valves, pressure-controlled devices, piezo-electric devices, linear motors, hydraulic actuators, voice coils, etc.

Based on inputs from the beam analysis module 110 and the apparatus 106, the line narrowing module 108 produces a light beam 150 (shown in FIG. 2) that is narrowed to within a target bandwidth that is supplied to the control system 112.

The beam analysis module 110 includes a bandwidth measurement system (also referred to as a bandwidth meter) 111 that includes at least one sensor that measures the bandwidth information of the light beam 104. The bandwidth measurement system 111 uses interferometric or dispersive instruments (such as spectrometers). For example, the bandwidth measurement system 111 can include one or more spectrometers having differing impulse response functions such as what is described in U.S. Pat. No. 6,952,267, entitled "Method and Apparatus for Measuring Bandwidth of a Laser Output," issued Oct. 4, 2005 (the '267 patent), which is incorporated herein by reference in its entirety. Each spectrometer provides an output that is representative of a measured parameter related to or containing information about the bandwidth of the light beam 104. The bandwidth measurement system 111 also includes a calculation apparatus that utilizes the spectrometer outputs as part of a system of equations. The equations employ predetermined calibration variables specific to the spectrometer and are used to calculate an estimate of the bandwidth of the light beam 104 according to one or more metrics. Such metric can be the spectrum full-width at some percentage or fraction (X) of the maximum value attained (FWXM), or it can be the width of a portion containing some percentage or fraction (Y) of the total energy (EY).

The bandwidth measurement system 111 includes a plurality of sets of predetermined calibration variables. Each of the plurality of sets is configured to provide a metric that is accurately tuned to estimate bandwidth over a particular range of wavelengths and at a particular center wavelength. For example, a first set of predetermined calibration variables can be associated with estimating bandwidth over a first range of bandwidths that is expected when operating the bandwidth actuation system 122 to actively control the optical feature 132. As another example, a second set of predetermined calibration variables can be associated with estimating a bandwidth over a second range of bandwidths that is expected when operating the actuation system 124 to actively control the optical feature 134.

Figure 3:
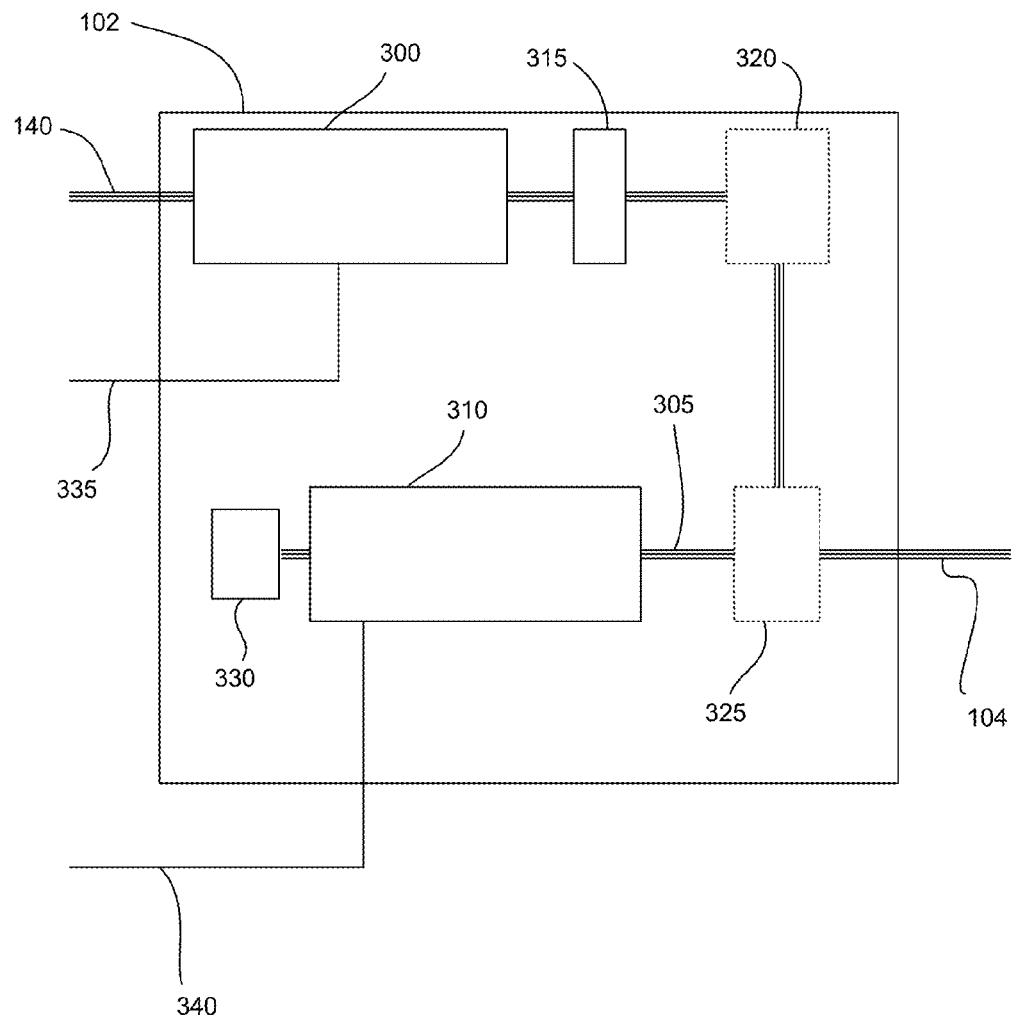
FIG. 3 is a block diagram of an exemplary light source that can be used in the light system of FIG. 1.

In some implementations, the light source 102 can be, for example, a pulsed laser light source that produces as the light beam 104 a pulsed laser beam. Referring also to FIG. 3, as an example of this implementation, the light source 102 includes a master oscillator (MO) 300 that provides a seed laser beam 305 to a power amplifier (PA) 310. The control system 112 is coupled to the master oscillator 300 by way of a connection 335 and to the power amplifier 310 by way of a connection 340. The power amplifier 310 can be, for example, a regenerative ring resonator, as described in U.S. application Ser. No. 12/413,341, entitled "Regenerative Ring Resonator," filed on Mar. 27, 2009, which is incorporated herein by reference in its entirety. The master oscillator 300 enables fine tuning of parameters such as the center wavelength and the bandwidth at relatively low output pulse energies. The power amplifier 310 receives the seed laser beam 305 from the master oscillator 300 and amplifies this output to attain the necessary powers in the light beam 104 (which is a laser beam in this implementation) for output to use in the apparatus 106.

The master oscillator 300 includes a discharge chamber having two elongated electrodes, a laser gas, and a fan for circulating the gas between the electrodes, and a laser resonator is formed between the line narrowing module 108 on one side of the discharge chamber and an output coupler 315 on a second side of the discharge chamber. The master oscillator 300 can also include a line center analysis module 320 that receives an output from the output coupler 315 and one or more beam modification optical systems 325 that modify the size and/or shape of the laser beam as needed. The laser gas used in the discharge chamber can be any suitable gas for producing a laser beam at a required wavelength and bandwidth, for example, the laser gas can be argon fluoride (ArF), which emits light at a wavelength of about 193 nm, or krypton fluoride (KrF), which emits light at a wavelength of about 248 nm.

The power amplifier 310 includes a power amplifier discharge chamber, and if it is a regenerative ring amplifier, the power amplifier 310 also includes a beam reflector 330 that reflects the laser beam back into the discharge chamber to form a circulating path. The power amplifier discharge chamber includes a pair of elongated electrodes, a laser gas, and a fan for circulating the gas between the electrodes. The seed laser beam 305 is amplified by repeatedly passing through the power amplifier 310. The beam modification optical system 325 provides a way (for example, a partially-reflecting mirror) to in-couple the seed laser beam 305 and to out-couple a portion of the amplified radiation from the power amplifier 310 to form the output laser beam 104.

Referring again to FIG. 1, the output laser beam 104 from the light source 102 can additionally be directed through a beam modification system 160 that can include one or more of a pulse stretcher, an auto shutter, and a beam delivery unit. At the pulse stretcher, each of the pulses of the output laser beam 104 can be stretched, for example, in an optical delay unit, to adjust for performance properties such as dose or exposure of the laser beam that impinges the apparatus 106. The laser beam 104 that exits the pulse stretcher can then be directed through the auto shutter before entering the beam delivery unit that directs the laser beam 104 to the apparatus 106.

Figure 4:
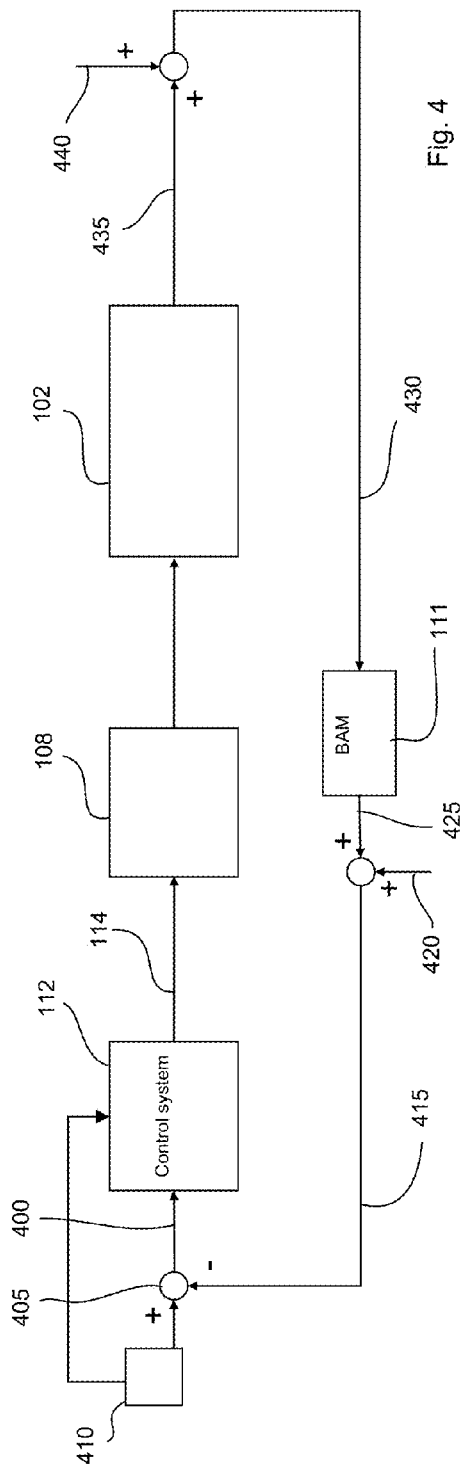
FIG. 4 is a block diagram of a control scheme used by a control system of the light system of FIG. 1.
Figure 5:
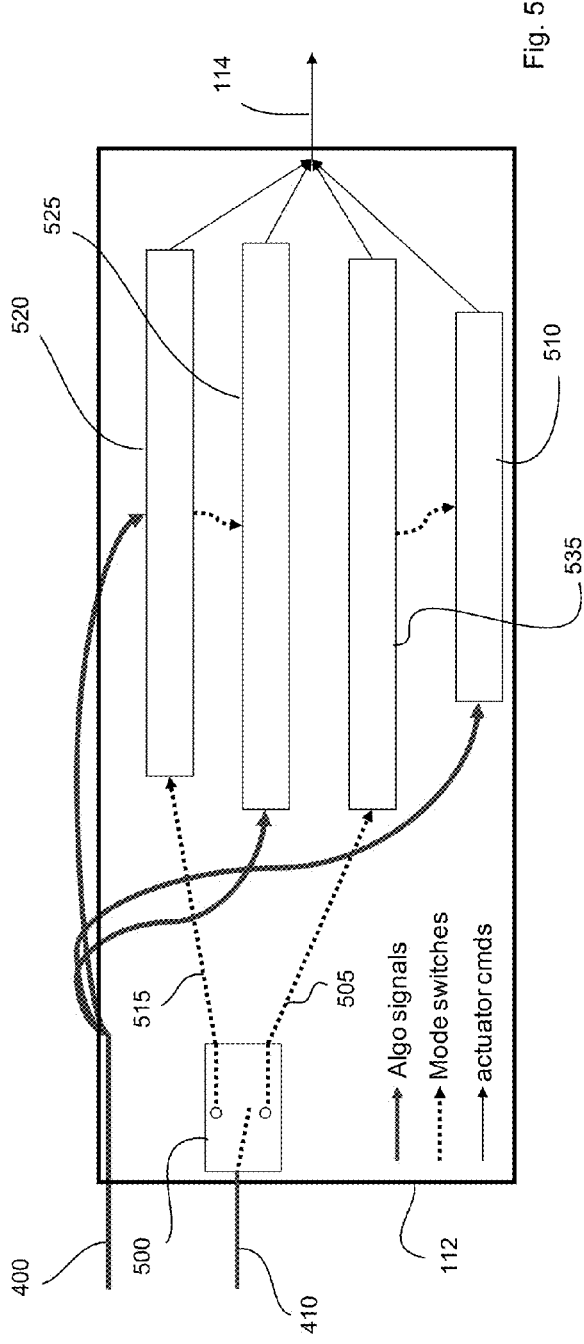
FIG. 5 is a block diagram of the control system used in the light system of FIG. 1.

Referring to FIGS. 4 and 5, the control system 112 operates using an error signal 400 obtained from an absolute value of a difference 405 between target bandwidth information 410 and measured bandwidth information 415. The measured bandwidth information 415 can be determined directly from an output 425 of the bandwidth measurement system 111 or it can be determined by removing noise 420 from the output 425 of the bandwidth measurement system 111. The output 114 from the control system 112 is sent to the line narrowing module 108 (specifically to the bandwidth control module 120, which outputs signals the actuation systems 122, 124, 126), which is connected to the light source 102 to cause changes in operation of the light source 102 to thereby change a bandwidth 435 output from the light source 102. The bandwidth measurement system 111 receives a portion of the light beam 104 for analysis of bandwidth, the light beam portion having a bandwidth 430 that is a combination of the bandwidth 435 controlled by one or more of the bandwidth actuation systems 122, 124, 126 and a disturbance 440 to the bandwidth 435, the disturbance 440 being caused by properties that vary within the light source such as, for example, thermal effects within the gas in the chambers or of the optical components within the light source 102, changes in output energy of the light source 102, changes in alignment or positioning of components within the light source 102, and acoustic effects (that can be observed through the effects of changes in a repetition rate of pulses of the light beam 104).

The control system 112 includes sub-systems (for example, sub-programs) such as a target bandwidth switch 500 (FIG. 5) that can select a target range of bandwidths from among a plurality of target ranges based on the target bandwidth information 410 supplied from a user or from the apparatus 106. Other sub-systems of the control system 112 include a set of operation modes associated with each of the target ranges. The control system 112 uses one or more of proportional, integral, and derivative control values in each of the modes. For a first target range of bandwidths 505, the control system 112 operates in a first range normal mode 510, which is considered a steady-state mode, after completing a first range switching mode 535, which is considered a temporary mode that enables the transition to the first range normal mode 510. For example, the first range normal mode 510 can be a closed-loop control mode that uses one or more of proportional, integral, and derivative control values. In the first range normal mode 510, the first bandwidth actuation system 122 is operated. The first range switching mode 535 can be an open-loop control mode or a closed-loop control mode.

Operation of the control system 112 in the first range normal mode 510 can be similar to the operation described in U.S. Pat. No. 6,393,037, entitled "Wavelength Selector for Laser with Adjustable Angular Dispersion," issued on May 21, 2002 (the '037 patent) and the operation described in U.S. Publication No. 2008/0253413, entitled "Laser Lithography System with Improved Bandwidth Control," filed on Apr. 9, 2008 (the '413 publication), both of which are incorporated herein by reference in their entirety. In these references, a magnification of a beam is changed prior to incidence on a dispersive element, and as the magnification is changed, the bandwidth of the light reflected from the dispersive element is changed. The magnification of the beam can be changed by actively introducing a change in an orientation (for example, an angle) of a beam expander (one or more prisms of a set of prisms). Thus, in the first range normal mode 510, the control system 112 can be configured to control the bandwidth actuation system 122 to modify an orientation (for example, an angle) of the optical feature (a beam expander) 132 to vary the magnitude of the angular dispersion provided by a dispersive element (a grating) in the optical system 138 to select a bandwidth in the first range of bandwidths.

For a second target range of bandwidths 515, the control system 112 operates in a second range normal mode 525 (considered a steady-state mode) after completing a second range switching mode 520, which is a temporary mode that enables the transition to the second range normal mode 525. For example, the second range normal mode 525 can be a closed loop control mode that uses integral control with a low gain while the second range switching mode 520 can be a closed loop control mode that uses proportional-integral control with a high gain. A "low" gain is generally one that yields very robustly stable (so-called "over-damped"), but somewhat slow (relative to actuator speed) closed-loop performance. A "high" gain is one that yields under-damped (oscillatory) performance, but is faster than low gain relative to the actuator speed. Each of these modes is described in greater detail below with reference to FIGS. 6-10.

For simplicity, the control system 112 shown in FIG. 5 and described below includes two target ranges of bandwidth and operates between these two target ranges. However, the control system 112 can include three or more target ranges and the procedure performed by the control system 112 can be modified to extend to three or more target ranges. For three or more ranges, the target bandwidth switch 500 switches between these three or more target ranges and the control system 112 includes other modes corresponding to operation in and switching between the other target ranges, as needed.

Figure 6:
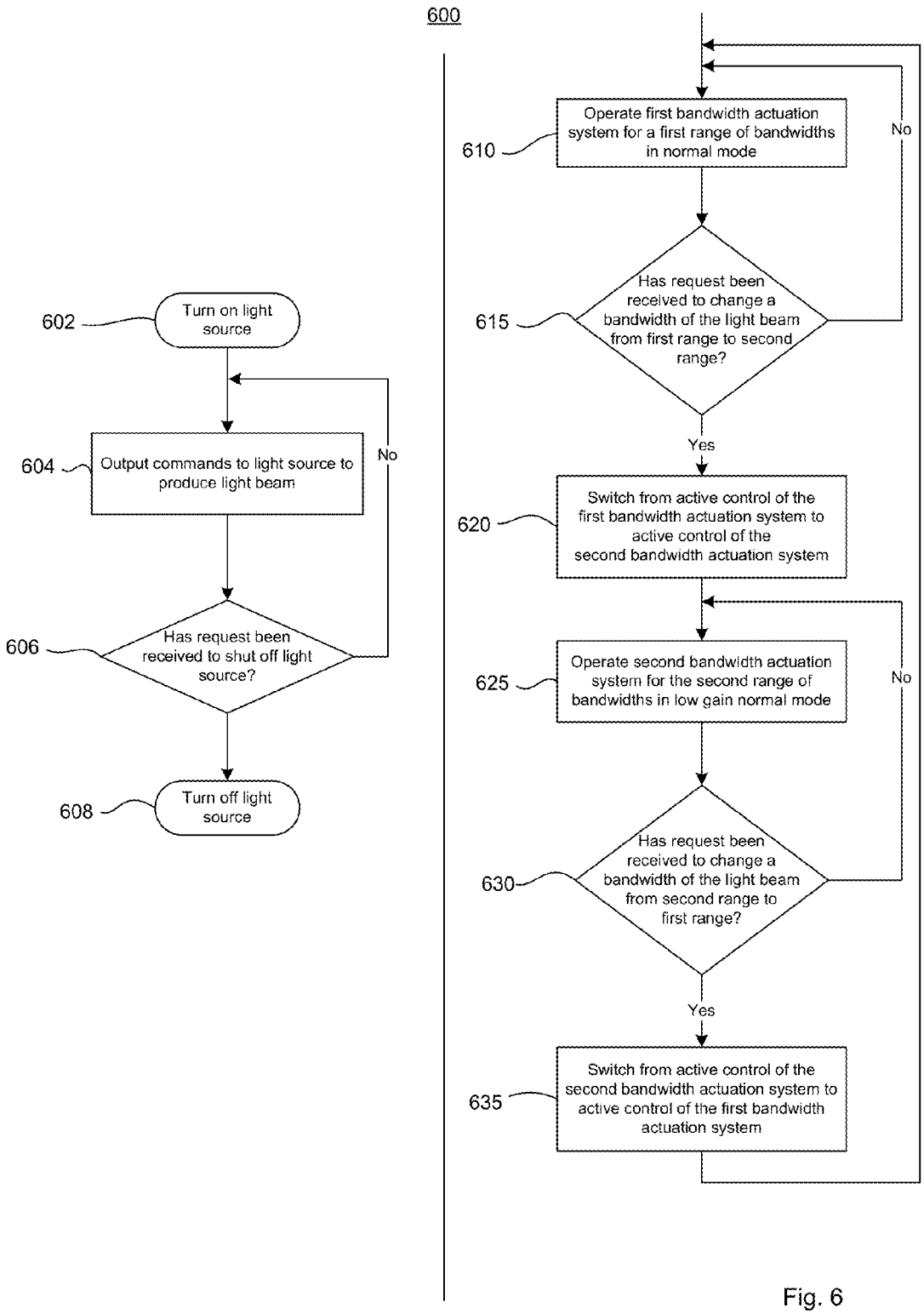
FIG. 6 is a flow chart of a procedure for selecting bandwidth in the light system of FIG. 1.

Referring also to FIG. 6, the control system 112 performs a procedure 600 for operating and controlling the light source 102 including controlling a bandwidth of the light beam 104 output to the apparatus 106.

The control system 112 performs parallel processes, two of which are shown in FIG. 6. In a first process (shown in the left hand side of the drawing as a generalized process), the control system 112 turns on the light source 102 (step 602) and outputs commands to the light source 102 to produce a light beam (step 604). For example, if the light source 102 is the laser source shown in FIG. 3 that includes a master oscillator 300 and a power amplifier 310, then the control system 112 (through the connections 335 and 340) controls the pulse energy and accumulated dose energy output from the laser source at predetermined pulse repetition rates. In this case, the control system 112 also provides triggering of the discharges in the chamber of the master oscillator and the discharges in the chamber of the power amplifier relative to each other with feedback and feed-forward control of the pulse and dose energy. The control system 112 determines if a request (for example, from the apparatus 106) is received to shut off the light source 102 (step 606) and if so, the control system 112 turns off the light source 102 (step 608).

The control system 112 also performs a second process (shown in the right hand side of the drawing) for controlling bandwidth of the light beam 104 while the control system 112 outputs commands to the light source 102 (step 604). In this second process, the control system 112 operates a first bandwidth actuation system (such as, for example, the bandwidth actuation system 122) in the first range normal mode 510 (step 610). The control system 112 determines if a request, for example, from the apparatus 106 or from a user, has been received to change the bandwidth of the light beam 104 from the first bandwidth range to a second bandwidth range that is distinct from the first bandwidth range (step 615). If the request has not been received (step 615), then the control system 112 continues to operate the first bandwidth actuation system 122 in the first range normal mode 510 (step 610). If, on the other hand, the request has been received (step 615), then the control system 112 switches from active control of the first bandwidth actuation system to active control of a second bandwidth actuation system (such as, for example, the bandwidth actuation system 124) in the second range switching mode 520 (step 620).

After switching is completed (step 620), the control system 112 operates the second bandwidth actuation system in the second range normal mode 525 (step 625). The control system 112 determines if a request, for example, from the apparatus 106 or from a user, has been received to change the bandwidth of the light beam 104 from the second bandwidth range to the first bandwidth range (step 630). If the control system 112 determines that request has not been received (step 630), then the control system 112 continues to operate the second bandwidth actuation system in the second range normal mode 525 (step 625). If the control system 112 determines that the request has been received (step 630), then the control system 112 switches from active control of the second bandwidth actuation system to active control of the first bandwidth actuation system in the first range switching mode 535 (step 635). Upon completion of switching, the control system 112 returns to operating the first bandwidth actuation system in the first range normal mode 510 (step 610).

Figure 7:
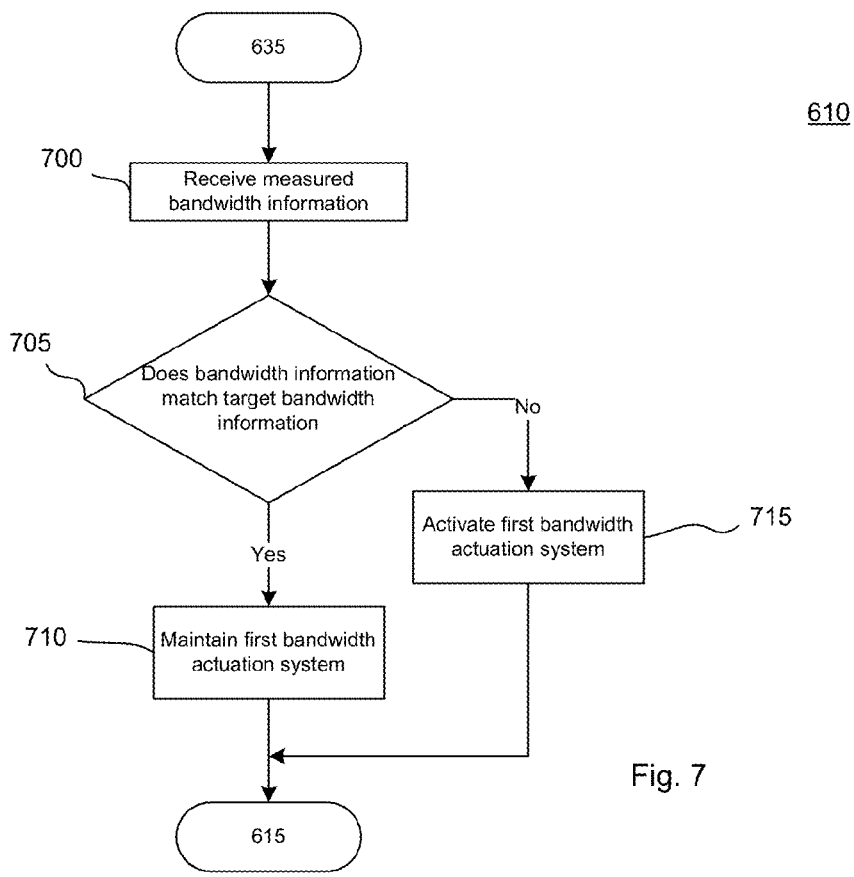
FIG. 7 is a flow chart of a procedure for operating a first bandwidth actuation system of the light system of FIG. 1.

Referring to FIG. 7, the control system 112 performs an exemplary procedure 610 for operating the first bandwidth actuation system (such as, for example, the bandwidth actuation system 122) in the first range normal mode 510. During the procedure 610, the control system 112 receives measured bandwidth information 415 from the bandwidth measurement system 111 (step 700). In this case, because the control system 112 is operating in the first range normal mode 510, the bandwidth measurement system 111 is using a first set of predetermined calibration variables to estimate the bandwidth information of the portion of the light beam 104. For example, the bandwidth measurement system 111 can use a metric such as the EY metric (which is the width of a portion containing some percentage or fraction "Y" (for example, 95%) of the total energy) to estimate the bandwidth of the light beam 104. The control system 112 determines if the measured bandwidth information 415 matches the target bandwidth information 410 (step 705).

The measured bandwidth information 415 can match the target bandwidth information 410 using any suitable test as there are several different ways to determine such matching. For example, the match determination could compare a weighted sum of the last N readings of bandwidth error (from target) against a threshold value. The bandwidth error is the absolute difference between the measured bandwidth and the target bandwidth. As another example, the match determination could simply detect when the sign of an arithmetic difference between (a possibly filtered) measured bandwidth and a target bandwidth changes.

The control system 112 can estimate a bandwidth by combining (noisy) measurements (from the measured bandwidth information 415) with a prediction (using a math model) based on the current actuator commands in a technique that can be referred to as "optimal estimation." In this case, the control system 112 determines if the measured bandwidth information 415 matches the target bandwidth information 410 by determining if this optimal estimation is different from a target bandwidth.

In another example, the matching determination can include determining if the bandwidth error is within a threshold for a certain amount of consecutive time. In yet another example, the matching determination can include determining whether the rate of change of the bandwidth error changes sign at least N times (this can be thought of as error signal oscillation with N oscillations). Moreover, most of these matching determinations are independent, so that one or more of the various possible independent matching determinations can be combined to determine whether the measured bandwidth information 415 matches the target bandwidth information 410 (step 705).

In some implementations, the measured bandwidth information 415 matches the target bandwidth information 410 if the absolute value of the difference 400 between the measured bandwidth information 415 and the target bandwidth information 410 is below a predetermined threshold value. If the measured bandwidth information 415 matches the target bandwidth information 410, then the control system 112 maintains the first bandwidth actuation system 122 in its current state (step 710). If the measured bandwidth information 415 does not match the target bandwidth information 410, then the control system 112 adjusts the first bandwidth actuation system 122 in a direction that causes the optical feature 132 to move to a new position to select new bandwidth information (such as a new bandwidth) that is closer to the target bandwidth information (for example, a target bandwidth) (step 715).

In some implementations, in the first range normal mode 510, the control system 112 uses an adjustment of a magnification of a beam incident on a dispersive element in the line narrowing module 108 to maintain the measured bandwidth information 415 near the target bandwidth information 410.

Figure 8:
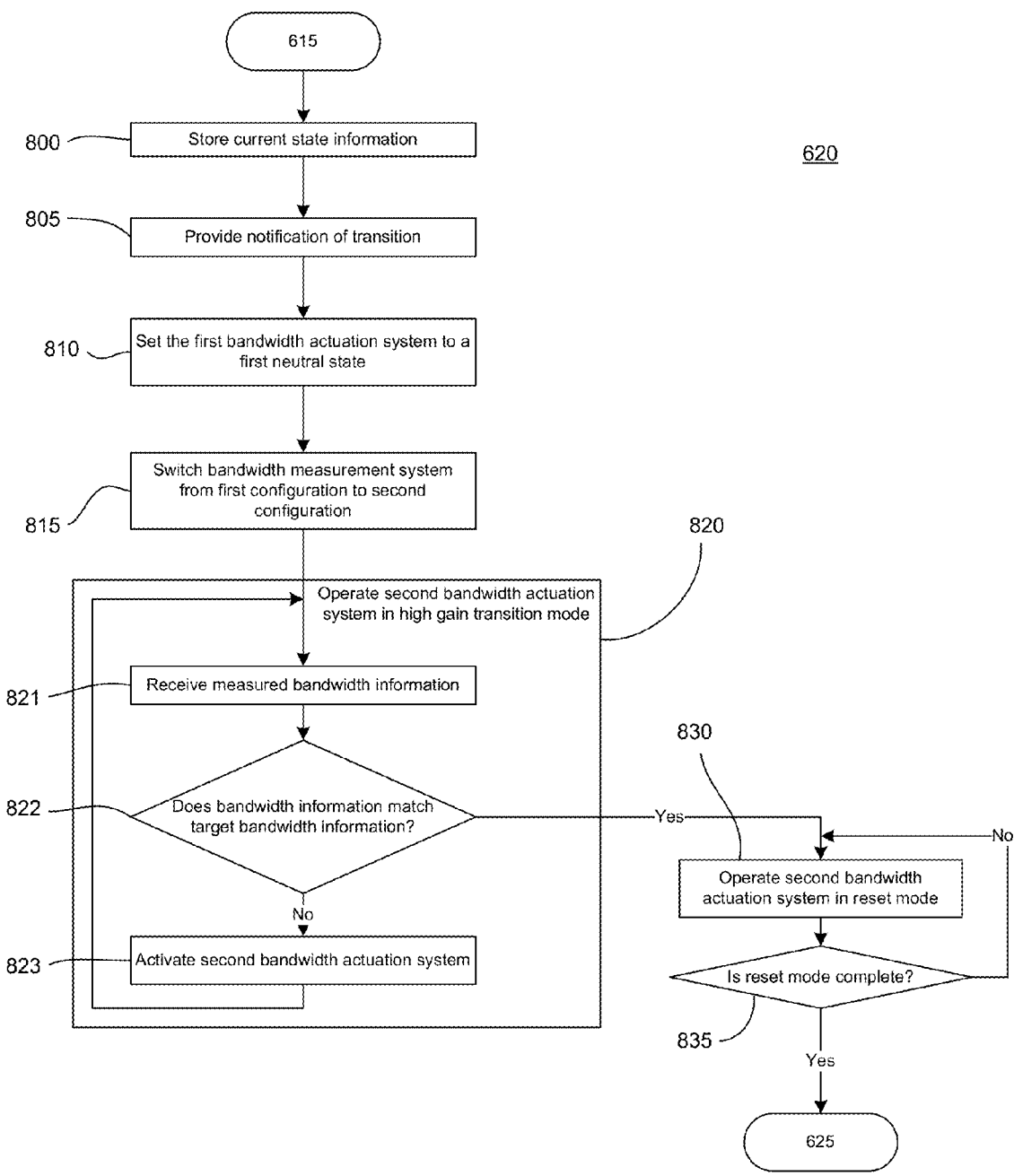
FIG. 8 is a flow chart of a procedure for switching from active control of the first bandwidth actuation system to a second bandwidth actuation system of the light system of FIG. 1.

Referring to FIG. 8, the control system 112 performs a procedure 620 to switch from active control of the first bandwidth actuation system (such as, for example, the bandwidth actuation system 122) to active control of the second bandwidth actuation system (such as, for example, the bandwidth actuation system 124) in the second range switching mode 520. The control system 112 stores information about the current state of the first bandwidth actuation system 122 (step 800). For example, the control system 112 stores information about the current state of the optical feature 132 (for example, the angle of the beam expander or the magnitude of the angular dispersion of the dispersive element) within the optical system 138. The control system 112 also provides a notification that it is in the second range switching mode 520 by outputting this notification as a signal to the output device 116 (step 805).

The control system 112 then sets the first bandwidth actuation system 122 to a previously-calibrated and fixed state (step 810). For example, each of the actuators within the first bandwidth actuation system 122 is set to a respective fixed state. The fixed state can be pre-determined using a suitable measurement method. For example, the fixed state can be the state of the first bandwidth actuation system at the moment the request to change the bandwidth of the produced light beam from the first bandwidth range to the second bandwidth range is received. As another example, the fixed state can be determined from a function of the state of the first bandwidth actuation system at the moment that a request is received to change the bandwidth of the produced light beam from the first bandwidth range to the second bandwidth range.

Even though the first bandwidth actuation system 122 is in the fixed state, it is possible for the first bandwidth actuation system 122 to impact the bandwidth of light beam 104. Therefore, two or more bandwidth actuation systems can influence the bandwidth of the light beam 104 at any one moment, but only one bandwidth actuation system is actively controlled at any one moment. The actual bandwidth of the light beam 104 is, at all times, a function of all of the actuator states even though only one of the bandwidth actuation systems is used to control the bandwidth within its particular range of bandwidths at any one particular moment. For example, the control system 112 actively controls the second bandwidth actuation system at step 625 but during this time, the control system 112 also maintains the first bandwidth actuation system in the fixed state and the bandwidth of the light beam 104 depends on both of the bandwidth actuation system states. For example, the second bandwidth actuation system can be used for controlling and selecting a "coarse" bandwidth range, while the first bandwidth actuation system can be used for controlling and selecting a bandwidth in a "fine" manner.

The control system 112 also sends a signal to the bandwidth measurement system 111 to switch from a first configuration that uses the first set of predetermined calibration variables that are more tuned to measurements within the first bandwidth range to a second configuration that uses the second set of predetermined calibration variables that are more tuned to measurements within the second bandwidth range (step 815).

The control system 112 operates the second bandwidth actuation system 124 in a transition mode (step 820). In this mode, the control system 112 receives measured bandwidth information 415 (for example, a measured bandwidth) from the bandwidth measurement system 111 (step 821) and determines if the measured bandwidth information 415 matches the target bandwidth information 410 (step 822). As discussed above with respect to step 705, the control system 112 can use any suitable method to determine matching. In some implementations, the control system 112 makes the matching determination using a combination of noise filtering and threshold logic, as described above in FIG. 4. Thus, for example, noise 420 is filtered from the measured bandwidth information 415 before being received by the control system 112. Moreover, the control system 112 can employ basic threshold logic in making this determination. Thus, the control system 112 can determine if the error signal 400 (that is, the absolute difference between the measured bandwidth information 415 and the target bandwidth information 410) is below a predetermined threshold value.

If the control system 112 determines that there is no match (step 822), then the control system 112 adjusts the second bandwidth actuation system 124 in a direction that causes the optical feature 134 to move to a new position to select new bandwidth information (such as a new bandwidth) that is closer to the target bandwidth information 410 (for example, a target bandwidth) (step 830). During this step, the first bandwidth actuation system 122 (and other bandwidth actuation systems excluding the bandwidth actuation system 124) is in the fixed state. Moreover, the gain of the feedback provided to the control system 112 is very high during the transition mode (step 820) to enable a more rapid completion of the transition to operating the second bandwidth actuation system 124 in the second range normal mode 525.

If the control system 112 determines that there is a match (step 822), then the control system 112 operates in a relatively brief reset mode in which it initiates a series of reset functions to allow it to learn and set other system states to a new operational condition (step 825). The reset mode is included because adjustments of bandwidth actuators can cause other laser parameters (for example, energy, laser gain, etc.) to change enough that their control systems do not function at an acceptable level. The reset mode essentially allows time for these other control systems to "learn" and adapt to the new laser parameters. In general, a reset may be necessary on any switch from any bandwidth range to any other bandwidth range. Moreover, each type of transition may have its own unique reset function. After the control system 112 determines that the reset mode is complete (step 830), the control system 112 then operates the second bandwidth actuation system in the second range normal mode 525 (step 625).

Figure 9:
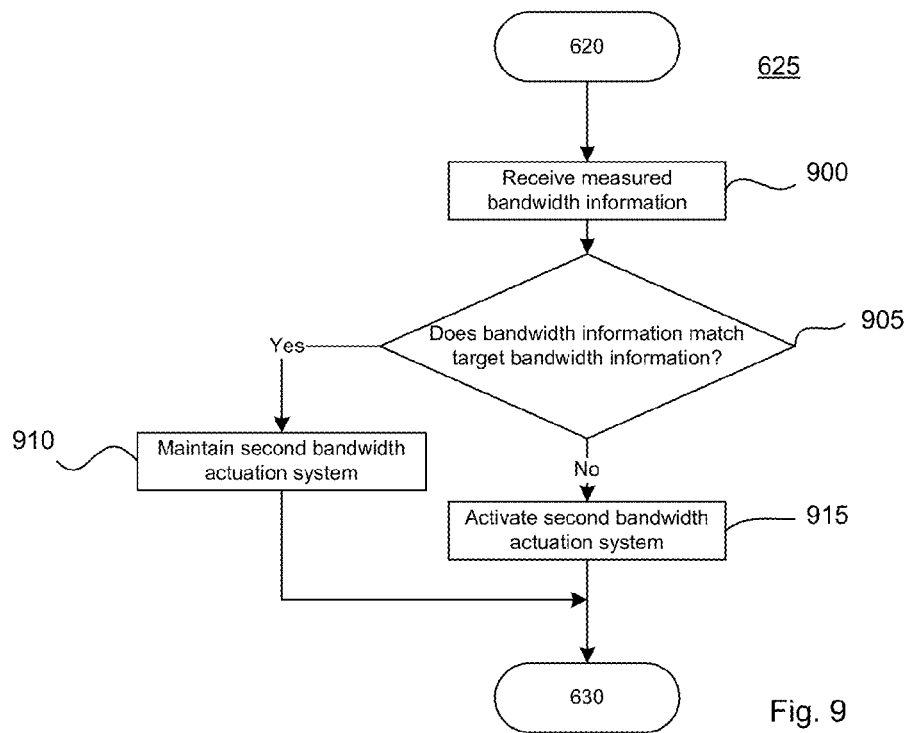
FIG. 9 is a flow chart of a procedure for operating the second bandwidth actuation system of the light system of FIG. 1.

Referring to FIG. 9, the control system 112 performs an exemplary procedure 625 for operating the second bandwidth actuation system (such as, for example, the bandwidth actuation system 124) in the second range normal mode 525. During the procedure 625, the control system 112 receives measured bandwidth information 415 from the bandwidth measurement system 111 (step 900). In this case, because the control system 112 is operating in the second range normal mode 525, the bandwidth measurement system 111 is using a second set of predetermined calibration variables to estimate the bandwidth information of the portion of the light beam 104. For example, the bandwidth measurement system 111 can use a metric such as the EX metric (which is the width of a portion containing some percentage or fraction (for example, 95%) of the total energy) to estimate the bandwidth of the light beam 104. The control system 112 determines if the measured bandwidth information 415 matches the target bandwidth information 410 (step 905). As discussed above with respect to step 705, the control system 112 can use any suitable method to determine matching. In some implementations, the measured bandwidth information 415 matches the target bandwidth information 410 if the absolute value of the difference 400 between the measured bandwidth information 415 and the target bandwidth information 410 is below a predetermined threshold value. If the measured bandwidth information 415 matches the target bandwidth information 410 (step 905), then the control system 112 maintains the second bandwidth actuation system 124 in its current state (step 910). If the measured bandwidth information 415 does not match the target bandwidth information 410, then the control system 112 adjusts the second bandwidth actuation system 124 in a direction that causes the optical feature 134 to move to a new position to select new bandwidth information (such as a new bandwidth) that is closer to the target bandwidth information (for example, a target bandwidth) (step 915).

In some implementations, the optical feature 134 is a dispersive optical body such as a grating and in the second range normal mode 525, the control system 112 adjusts one or more forces applied to the grating in the line narrowing module 108 to maintain the measured bandwidth information 415 near the target bandwidth information 410. Such a second range normal mode 525 is described in the '306 application, discussed above. Additionally, in the second range normal mode 525, the first optical feature 132 is maintained at a fixed state since the first bandwidth actuation system 122 is maintained at its fixed state (step 810).

In some implementations, the control system 112 can perform active control (steps 905-915) of the second bandwidth actuation system 124 only under certain operating conditions of the light source 102, for example, if the repetition rate of the light source 102 is maintained within a predetermined suitable range. Thus, if the light source 102 fires outside the predetermined suitable range, then the control system 112 maintains the second bandwidth actuation system 124 at its current state, effectively operating in an open loop mode.

Figure 10:
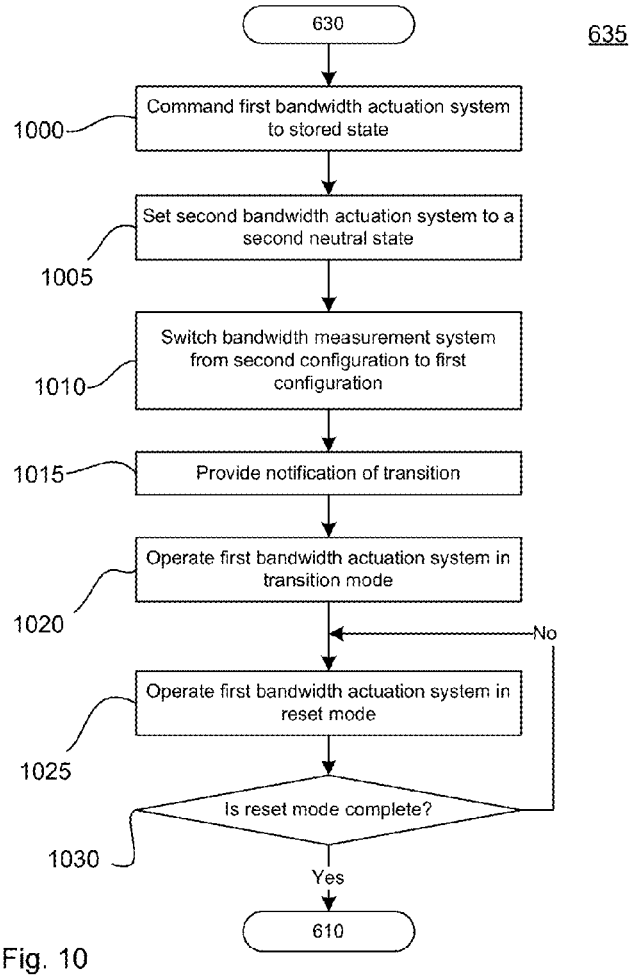
FIG. 10 is a flow chart of a procedure for switching from active control of the second bandwidth actuation system to the first bandwidth actuation system of the light system of FIG. 1.

Referring to FIG. 10, the control system 112 performs a procedure 635 to switch from active control of the second bandwidth actuation system (such as, for example, the bandwidth actuation system 124) to active control of the first bandwidth actuation system (such as, for example, the bandwidth actuation system 122) in the first range switching mode 535. The control system 112 operates the first bandwidth actuation system 122 in a transition mode (step 1000). In some implementations, in the transition mode (step 1000), the first bandwidth actuation system 122 is commanded to the state that was stored in step 800.

The control system 112 then sets the second bandwidth actuation system 124 to a fixed state (step 1005). For example, each of the actuators within the second bandwidth actuation system 124 is set to a respective fixed state. In some implementations, the fixed state can be the state of the second bandwidth actuation system at the moment the request to change the bandwidth of the produced light beam from the second bandwidth range to the first bandwidth range is received. In other implementations, the fixed state is a predetermined state that is determined during calibration.

The control system 112 sends a signal to the bandwidth measurement system 111 to switch from the second configuration that uses the second set of predetermined calibration variables that are more tuned to measurements within the second bandwidth range to the first configuration that uses the first set of predetermined calibration variables that are more tuned to measurements within the first bandwidth range (step 1010). The control system 112 also provides a notification that it is in the first range switching mode 535 by outputting this notification as a signal to the output device 116 (step 1015).

Next, the control system 112 operates in a relatively brief reset mode in which it initiates a series of reset functions to allow it to learn and set other system states to a new operational condition (step 1020). After the control system 112 determines that the reset mode is complete (step 1025), the control system 112 then operates the first bandwidth actuation system in the first range normal mode 510 (step 610).

Figure 11:
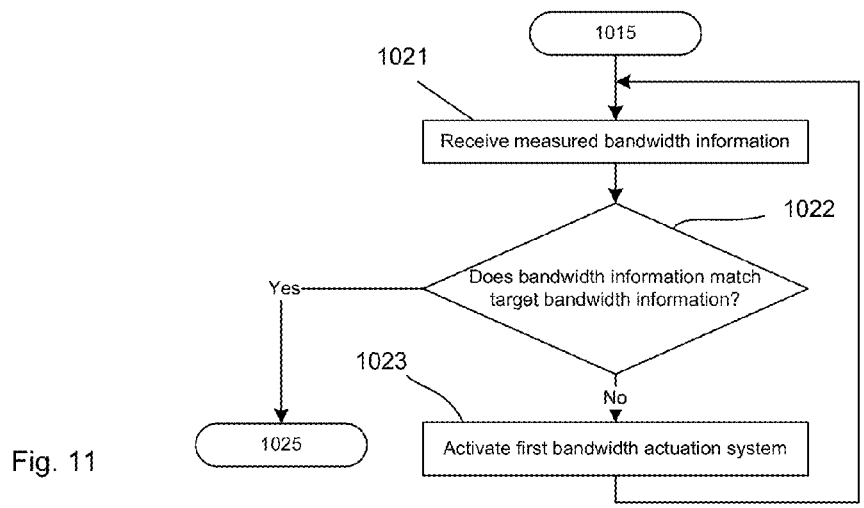
FIG. 11 is a flow chart of a procedure for operation of a first bandwidth actuation system in a closed-loop transition mode.

Referring also to FIG. 11, in some implementations, the transition mode at step 1000 can be a closed-loop control mode in which the control system 112 receives measured bandwidth information 415 (for example, the measured bandwidth) from the bandwidth measurement system 111 (step 1021) and determines if the measured bandwidth information 415 matches the target bandwidth information 410 (step 1022). As discussed above with respect to step 705, the control system 112 can use any suitable method to determine matching. For example, the control system 112 makes the determination using a combination of noise filtering and threshold logic, as described above in FIG. 4. If the control system 112 determines that there is no match (step 1022), then the control system 112 adjusts the first bandwidth actuation system 122 in a direction that causes the optical feature 132 to move to a new position to select new bandwidth information (such as a new bandwidth) that is closer to the target bandwidth information 410 (for example, a target bandwidth) (step 1023). During this step, the second bandwidth actuation system 124 (and any bandwidth actuation system other than the first bandwidth actuation system 122) is maintained in its respective fixed state. If the control system 112 determines that there is a match (step 1022), then the control system 112 operates in the brief reset mode (step 1025).

As discussed above, the light system 100 can be a laser system that operates on a lithography machine 106. In this case, the laser system 100 is able to operate and control the laser source 102 at two or more distinct bandwidths. For example, in this implementation, the first distinct bandwidth range can be a narrower bandwidth range, for example, less than about 0.5 pm and the second distinct bandwidth range can be a wider bandwidth range, for example, between about 0.5 and about 1.7 pm. Such a wider bandwidth range can be useful in applications such as focus drilling, which enables certain lithographic processes (such as creating contact holes) to be more efficiently and suitably performed.

In some implementations, the metric that can be used to measure the bandwidth of the light beam 104 can be mean absolute defocus (MAD), which is described in U.S. Application No. 61/236,848, "Active Spectral Control of Laser Light Source," filed on Aug. 25, 2009, which is incorporated herein by reference in its entirety.

The control system 112 can include one or more of digital electronic circuitry, computer hardware, firmware, and software. The control system 112 can also include appropriate input and output devices, a computer processor, and a computer program product tangibly embodied in a machine-readable storage device for execution by a programmable processor. The procedure embodying the techniques (discussed above) may be performed by a programmable processor executing a program of instructions to perform desired functions by operating on input data and generating appropriate output. Generally, a processor receives instructions and data from a read-only memory and/or a random access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Other implementations are within the scope of the following claims.

What is claimed is:

1. A method comprising:
    producing a light beam;
    controlling a bandwidth of the produced light beam within a first target range of bandwidths including activating and controlling a first bandwidth actuation system connected to a first optical feature optically coupled to the produced light beam;
    controlling a bandwidth of the produced light beam within a second target range of bandwidths including activating and controlling a second bandwidth actuation system connected to a second optical feature optically coupled to the produced light beam; and
    switching between activating and controlling the first bandwidth actuation system and activating and controlling the second bandwidth actuation system independently and separately of activating and controlling the first bandwidth actuation system based on a provided bandwidth measurement and a selected target bandwidth;
    wherein:

the second target range of bandwidths is distinct from the first target range of bandwidths,
only the first bandwidth actuation system is used to control the bandwidth of the produced light beam within the first target range of bandwidths, and
only the second bandwidth actuation system is used to control the bandwidth of the produced light beam within the second target range of bandwidths.

2. The method of claim 1, further comprising receiving a request to change a bandwidth of the produced light beam from the first target range of bandwidths to the second target range of bandwidths.

3. The method of claim 1, further comprising switching between bandwidth control within the first target range and bandwidth control within the second target range in response to a command to switch.

4. The method of claim 1, further comprising switching between bandwidth control within the first target range to bandwidth control within the second target range, wherein the switching includes:
selecting second target bandwidth information;
setting the first bandwidth actuation system to a first fixed state;
switching a bandwidth measurement system from a first configuration to a second configuration;
receiving measured bandwidth information from the bandwidth measurement system;
determining whether the measured bandwidth information matches the second target bandwidth information; and
activating the second bandwidth actuation system to cause the second optical feature to modify the bandwidth of the produced light beam until it is determined that the measured bandwidth information matches the second target bandwidth information.

5. The method of claim 4, wherein receiving measured bandwidth information from the bandwidth measurement system includes receiving the measured bandwidth information while operating in the second configuration.

6. The method of claim 4, further comprising storing information about the state of one or more components of the first bandwidth actuation system before setting the first bandwidth actuation system to the first fixed state.

7. The method of claim 4, wherein the first fixed state is the state of the first bandwidth actuation system at the moment the request to change the bandwidth of the produced light beam from the first target bandwidth range to the second target bandwidth range is received.

8. The method of claim 4, wherein the first fixed state is determined from a function of the state of the first bandwidth actuation system at the moment that a request is received to change the bandwidth of the produced light beam from the first target bandwidth range to the second target bandwidth range.

9. The method of claim 4, further comprising controlling the second bandwidth actuation system to reduce an absolute error between the measured bandwidth information and the second target bandwidth information until a request is received to change the bandwidth of the produced light beam from the second target bandwidth range to the first target bandwidth range.

10. The method of claim 4, further comprising controlling the second bandwidth actuation system in a reset mode after switching the bandwidth measurement system from the first configuration to the second configuration.

11. The method of claim 4, further comprising switching between bandwidth control within the second target range to bandwidth control within the first target range upon receipt of the request to change bandwidth of the produced light beam from the second target bandwidth range to the first target bandwidth range, switching including:
selecting first target bandwidth information;
setting the second bandwidth actuation system to a second fixed state;
switching the bandwidth measurement system from the second configuration to the first configuration;
receiving measured bandwidth information from the bandwidth measurement system while operating in the first configuration;
determining whether the measured bandwidth information matches the first target bandwidth information; and
activating the first bandwidth actuation system to cause the first optical feature to modify the bandwidth of the produced light beam until it is determined that the measured bandwidth information matches the first target bandwidth information.

12. The method of claim 11, wherein the second fixed state is the state of the second bandwidth actuation system at the moment the request to change the bandwidth of the produced light beam from the second target bandwidth range to the first target bandwidth range is received.

13. The method of claim 11, wherein the second fixed state is a pre-determined state that is determined during calibration.

14. The method of claim 11, further comprising controlling the first bandwidth actuation system to reduce the absolute error between the measured bandwidth information and the first target bandwidth information until a request is received to change the bandwidth of the produced light beam from the first target bandwidth range to the second target bandwidth range.

15. The method of claim 11, further comprising sending a signal to the first bandwidth actuation system to return to the state that was stored prior to setting the first bandwidth actuation system to the first fixed state.

16. The method of claim 11, further comprising controlling the first bandwidth actuation system in a reset mode after switching the bandwidth measurement system from the second configuration to the first configuration.

17. The method of claim 1, further comprising switching between bandwidth control within the first target range to bandwidth control within the second target range, wherein switching between bandwidth control within the first target range to bandwidth control within the second target range comprises switching a bandwidth measurement system from a first configuration to a second configuration.

18. The method of claim 17, wherein switching the bandwidth measurement system from the first configuration to the second configuration includes switching from a first set of calibration variables to a second set of calibration variables.

19. The method of claim 18, wherein:
the first set of calibration variables is predetermined and configured to provide a metric that is tuned to estimate bandwidth over the first target range of bandwidths; and
the second set of calibration variables is predetermined and configured to provide a metric that is tuned to estimate bandwidth over the second target range of bandwidths.

20. The method of claim 1, wherein producing the light beam includes producing a laser beam.

21. A method of controlling a bandwidth of a pulsed laser beam comprising:
producing the pulsed laser beam;
receiving measured bandwidth information of the produced laser beam from a bandwidth measurement system;

based on the received measured bandwidth information, controlling a bandwidth of the produced laser beam to within a plurality of target ranges of bandwidths;

for each of the target ranges of bandwidths, activating and controlling a bandwidth actuation system connected to an optical feature optically coupled to the produced laser beam; and switching between controlling one of the bandwidth actuation systems and controlling another of the bandwidth actuation systems independently and separately of controlling one of the bandwidth actuation systems based on the received measured bandwidth information and a selected target bandwidth;

wherein:

each target range of bandwidths in the plurality of target ranges is distinct from each of the other target ranges of bandwidths in the plurality of ranges, and only one of the bandwidth actuation systems is activated and controlled to control the bandwidth to within a particular target range of bandwidths at any one particular moment.

22. The method of claim 21, further comprising receiving a request to change a bandwidth of the produced light beam from one of the target range of bandwidths to another of the target range of bandwidths.

23. The method of claim 21, further comprising switching between bandwidth control within a first target range of bandwidths by controlling a first bandwidth actuation system and bandwidth control within a second target range of bandwidths by controlling a second bandwidth actuation system in response to a command to switch.

24. The method of claim 23, wherein the switching includes:

selecting second target bandwidth information;

setting the first bandwidth actuation system to a first fixed state;

switching a bandwidth measurement system from a first configuration to a second configuration;

determining whether the measured bandwidth information matches the second target bandwidth information; and activating the second bandwidth actuation system to cause the second optical feature to modify the bandwidth of the produced light beam until it is determined that the measured bandwidth information matches the second target bandwidth information.

* * * * *